Aug. 28, 1945.  J. HIRSHSTEIN  2,383,482
CHECK VALVE
Filed Nov. 26, 1943  2 Sheets-Sheet 1

INVENTOR.
JOSEPH HIRSHSTEIN.
BY Fay, Gdrick, Chilton & Isler.
attorneys.

Aug. 28, 1945.   J. HIRSHSTEIN   2,383,482
CHECK VALVE
Filed Nov. 26, 1943   2 Sheets-Sheet 2

INVENTOR.
JOSEPH HIRSHSTEIN.

Patented Aug. 28, 1945

2,383,482

UNITED STATES PATENT OFFICE 2,383,482

CHECK VALVE

Joseph Hirshstein, Cleveland, Ohio, assignor of one-half to Ruth R. Newman and one-half to Mildred Hirshstein, both of Cleveland, Ohio Application November 26, 1943, Serial No. 511,808

2 Claims. (Cl. 251—123)

This invention relates to a back water check valve of the pivoted swing-check type particularly adaptable to surface drain structure wherein the check valve mechanism is located in the riser leg of the trap formation comprising part of the drain structure. Such valve mechanism, heretofore, comprised a swingable valve member which is swung downwardly upon a valve seat or surface which is disposed at an angle to both the horizontal and the vertical. The function of such valves is the control of flow in a drain line or the like, where there is danger of back water surging back into the line from the main sewer and up through the surface drain.

More particularly my invention is concerned with a surface drain side swing valve which is normally closed, but which will become unseated under the influence of a low water head of surface drainage water and allow the passing of the water in the direction of the outlet at a very low pressure. On the other hand, the valve will be firmly closed under the pressure of back water due to a flooded condition of the main sewer.

The main object of the present invention is to provide such a mounting for the valve disk that the disk will swing about a substantially vertical axis and will impart to the latter a particular sensitivity of operation to pressure differential.

Another object of the present invention is to provide a check valve of the side swing type which is simple in construction, has a few parts easily to assemble and repair, and will remain dependable and sensitive in operation.

My novel back water check valve is particularly useful in a surface drain when combined with a deep seal trap and the embodiment shown in the drawings illustrates that form of application.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various forms in which the principle of the invention may be used.

In said annexed drawings—

Figure 1:
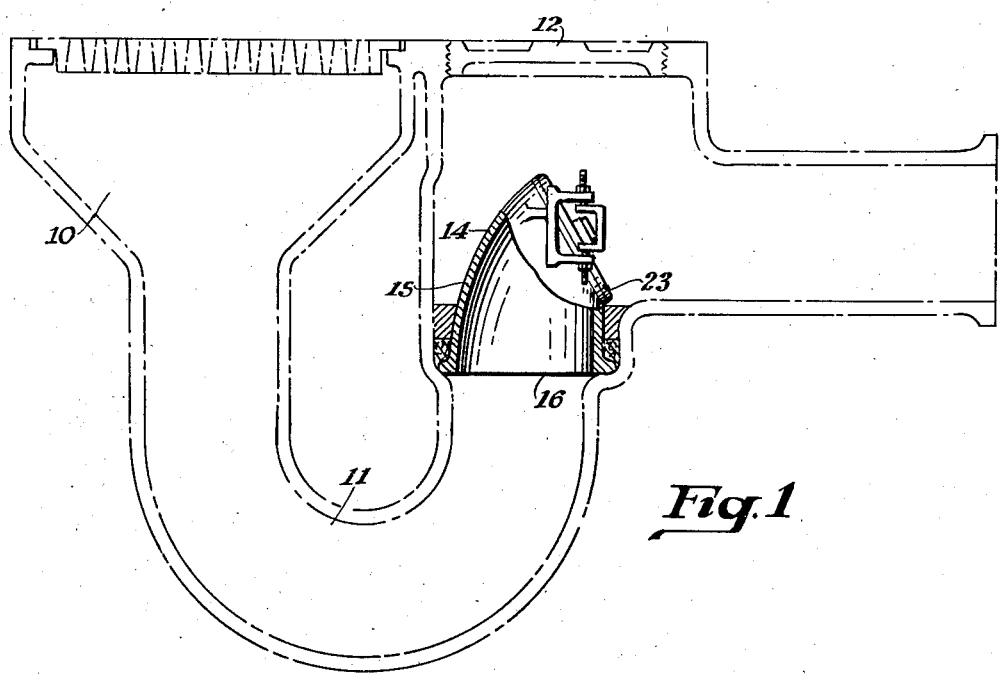
Fig. 1 illustrates a surface drain construction, shown in dotted lines, with the riser pipe or outlet trap leg having the valve according to the invention mounted thereon and shown partly in section and partly in elevation.

As illustrated in Fig. 1, the valve according to my invention is mounted in the median part of the outlet leg of a deep seal trap 11 of a drain 10. Deep seal trap 11 is provided with a cleanout 12 having its top aligned with the top of the drain 10.

Figures 2, 3:
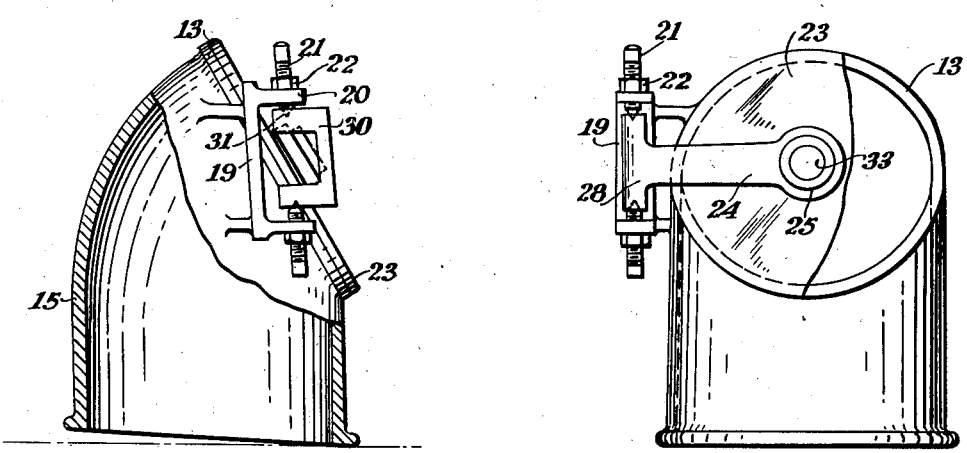
Fig. 2 is a side elevation of the valve on a larger scale and showing an alternate form of elbow in combination therewith.
Fig. 3 is a front elevation of the valve of Fig. 1 on a larger scale and with part of the valve disk broken away.
Figure 4:
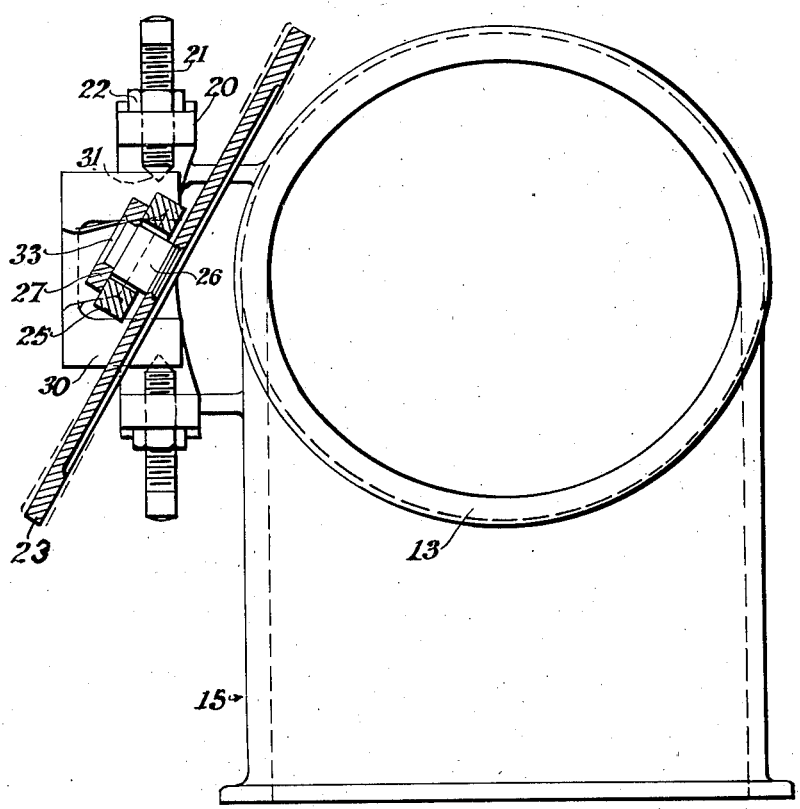
Fig. 4 is a front elevation on a still larger scale of the valve body shown in Figs. 1 and 3 supporting the valve disk and the mounting therefor, the disk being shown in section in an open position.

The back water check valve mechanism, which is generally designated by 14, is supported by a valve body, hereafter referred to as an elbow 15. The elbow, as shown in Figs. 1, 3 and 4, has its bottom end 16 shown as being disposed in a horizontal position, whereas the elbow in Fig. 2 shows a valve in which the plane of the bottom surface of the valve body or elbow 15 is disposed or formed in a plane at a slight angle with the horizontal. The purpose of this will be explained more fully later on.

As more clearly shown in Figs. 2 to 4 inclusive, the elbow 15 carries in its upper portion a supporting bracket 19 with projection lugs 20 adapted to receive a trunnion bearing for pivotally mounting the valve disk thereon. These lugs may be formed as an integral part of the elbow or they may be attached in a convenient manner. Each of the lugs 20 has an externally threaded bore which engages with a threaded bolt 21; lock nuts 22 are provided for fastening the bolts after they have been adjusted in proper relation to the pivot sockets 31, as will be explained.

The upper or outlet end of the elbow 15 may terminate in a flange 13 which forms a seat for the valve disk 23, the seating face being an inclined plane with respect to the vertical as shown, or being in the vertical plane. Disk 23 is loosely supported by an arm 24 in a hub-shaped end 25 thereof. A stubshaft or lug 26, integrally formed on disk 23 or attached thereto, is loosely fitted in said hub end 25 and held therein by an annulus 27 over which the shaft 26 is peened as shown at 33. The loose connection between the disk and its supporting arm makes it possible for the disk to adjust itself to proper seating position.

The other end of arm 24 is T-shaped, the two ends 28 of the T-bar being provided with lugs 30 projecting therefrom to meet lugs 20 and having cone-shaped sockets 31 registering with the bores in lugs 20. Said cone-shaped sockets engage with the points of bolts 21 forming the trunnion bearing for the pivotal support of arm 24.

Figure 5:
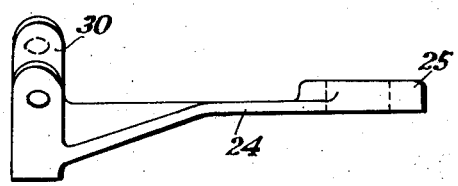
Fig. 5 is a perspective view of the disk supporting arm.

In the embodiment shown in the drawings the two ends of arm 24 are at different angles with respect to the vertical. Hub 25 is parallel to valve disk 23 and the T-bar intermediate ends 28 are parallel to bracket 19. In order to compensate for this difference arm 24 has a bend in it as shown in Fig. 5.

As will be seen from Fig. 2 of the drawings the bearing axis of the trunnion bearing, which is identical with the swinging axis of arm 24, lies on a plane passing through the bolts 21 and the bearing sockets 31 and is slightly offset with respect to the vertical position. In the position of the elbow shown in Fig. 2 the valve disk is swung to closed position by gravity partly by reason of the slight tilt of the elbow toward the drain opening and partly by the offset position of the swinging axis of the disk. However, it has been mentioned above that the valve disk should respond to the slightest pressure differential within the line to open up and let drainage water pass through to the outlet side. By predetermining the amount of the drainward tilt of the elbow or valve body 15 coupled with a predetermined amount of tilt of the swinging axis so that the gravitational influence is just sufficient to cause the disk to be swung to a closed or seated position, a sensitive supporting of the disk is obtained. If the elbow is mounted as thus explained any pressure prevailing upon the disk by a flowing liquid will be sufficient to open the valve disk and let water pass, but the valve disk will return automatically to closed position as soon as the flow ceases.

Referring to the valve shown in Fig. 2, the plane of the lower end edge of the elbow 15 is at a slight angle to horizontal so that by forming the seat on the trap 11 for the elbow in a plane at a corresponding angle to horizontal, an adjustment of the closing tendency of the valve may be effected according to the position in which the valve elbow 15 is seated on the trap.

With customary constructions such response to pressure differential is not reliable, because the valve disk, once seated, has a tendency to remain in that position until a very substantial pressure from the inlet side could push it open. This is due to the fact that the swinging axis of the disk has been disposed heretofore to extend horizontally and at a position at the top of the elbow. With the means above indicated I am able to overcome any such tendency of the valve member to lag, the slightest pressure from the inlet side being sufficient to open the valve disk at all times, except when the pressure from back water keeps the disk in a safely closed position as is desirable in devices of the type described.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a back water check valve mechanism for a drain line, an elbow fitting having an inlet port at one end and an outlet port at the other end, a seating face on the outlet end thereof in an inclined plane with respect to the axis of the inlet port; means carried on said fitting for supporting a valve disc; a valve disc mounted on said means and constructed and arranged to normally seek a closed position but capable of being opened by slight fluid pressure within the fitting, the mounting for said disc comprising a supporting arm pivotally mounted at one end on said disc supporting means and having its other end loosely connected to said disc; a trunnion bearing for effecting said pivotal connection, said bearing having a center line at a slight angle to the axis of the inlet port, said angle being smaller than the angle of inclination of the seating face, said elbow having its bottom edge in a plane at a slight angle to a plane normal to the axis of the inlet port whereby the sensitivity of the valve disc to the fluid pressure differential may be partially adjusted during installation.

2. In a back water check valve mechanism for a drain line, an elbow fitting having an inlet port at one end and an outlet port at the other end, a seating face on the outlet end thereof in an inclined plane with respect to the axis of the inlet port; a means carried on said fitting for supporting a valve disc; a valve disc mounted on said supporting means and constructed and arranged to normally seek a closed position but capable of being opened by slight fluid presure, the mounting for said disc comprising a supporting arm pivotally mounted at one end on said supporting means and having its other end loosely connected to said disc; a trunnion bearing for effecting said pivotal connection, said bearing having a center line at a slight angle to the axis of the inlet port, said angle being smaller than the angle of inclination of the seating face, said valve disc supporting arm being formed with a bend to compensate for said difference in inclination, said elbow having its bottom edge in a plane at a slight angle to a plane normal to the axis of the inlet port whereby the sensitivity of the valve disc to the fluid pressure differential may be partially adjusted during installation.

JOSEPH HIRSHSTEIN.